US007713011B2

United States Patent
Orszagh et al.

(10) Patent No.: US 7,713,011 B2
(45) Date of Patent: May 11, 2010

(54) FASTENER ASSEMBLY HAVING MARGINAL END PORTION OF BODY DEFORMED ABOUT CAPTURED NUT

(75) Inventors: Thomas O. Orszagh, Lakeview, NY (US); Adam D. Pratt, Buffalo, NY (US)

(73) Assignee: Sherex Fastening Solutions, LLC, Lancaster, NY (US)

( * ) Notice: Subject to any disclaimer, the term of this patent is extended or adjusted under 35 U.S.C. 154(b) by 484 days.

(21) Appl. No.: 11/657,944

(22) Filed: Jan. 25, 2007

(65) Prior Publication Data

US 2008/0181744 A1 Jul. 31, 2008

(51) Int. Cl.
*F16B 37/04* (2006.01)
(52) U.S. Cl. .............................. 411/34; 411/37; 411/113
(58) Field of Classification Search .................. 411/34, 411/37, 52, 111–113, 180, 969
See application file for complete search history.

(56) References Cited

U.S. PATENT DOCUMENTS

| 1,650,958 A | * | 11/1927 | Ogden et al. | 411/52 |
|---|---|---|---|---|
| 1,761,358 A | * | 6/1930 | Mitchel | 411/113 |
| 2,078,411 A | * | 4/1937 | Richardson | 411/113 |
| 2,553,236 A | * | 5/1951 | Bratfisch | 411/34 |
| 3,731,961 A | * | 5/1973 | Becke | 403/408.1 |
| 5,074,726 A | * | 12/1991 | Betchel et al. | 411/34 |
| 5,096,349 A | * | 3/1992 | Landy et al. | 411/108 |
| 5,253,962 A | * | 10/1993 | Close, Jr. | 411/34 |
| 7,059,815 B2 | * | 6/2006 | Ando et al. | 411/34 |

* cited by examiner

*Primary Examiner*—Flemming Saether
(74) *Attorney, Agent, or Firm*—Phillips Lytle LLP

(57) ABSTRACT

This invention provides a fastener (20) that is adapted to be mounted in a hole provided in a wall (not shown). The improved fastener comprises: an elongated tubular body (21) having a first end (23) and a second end (24), having an outwardly-extending flange (25) adjacent the first end, having an intermediate portion (27), and having a distal marginal end portion (37) adjacent the second end, the body also having an abutment surface (32) facing toward the second end; and a member (22) adapted to be inserted into the body through the second end, the member having an abutment surface (40) adapted to bear against the body abutment surface, and having an outer polygonal surface (41); and wherein the body marginal end portion (37) is adapted to be plastically deformed about the member to hold the member within the body.

9 Claims, 1 Drawing Sheet

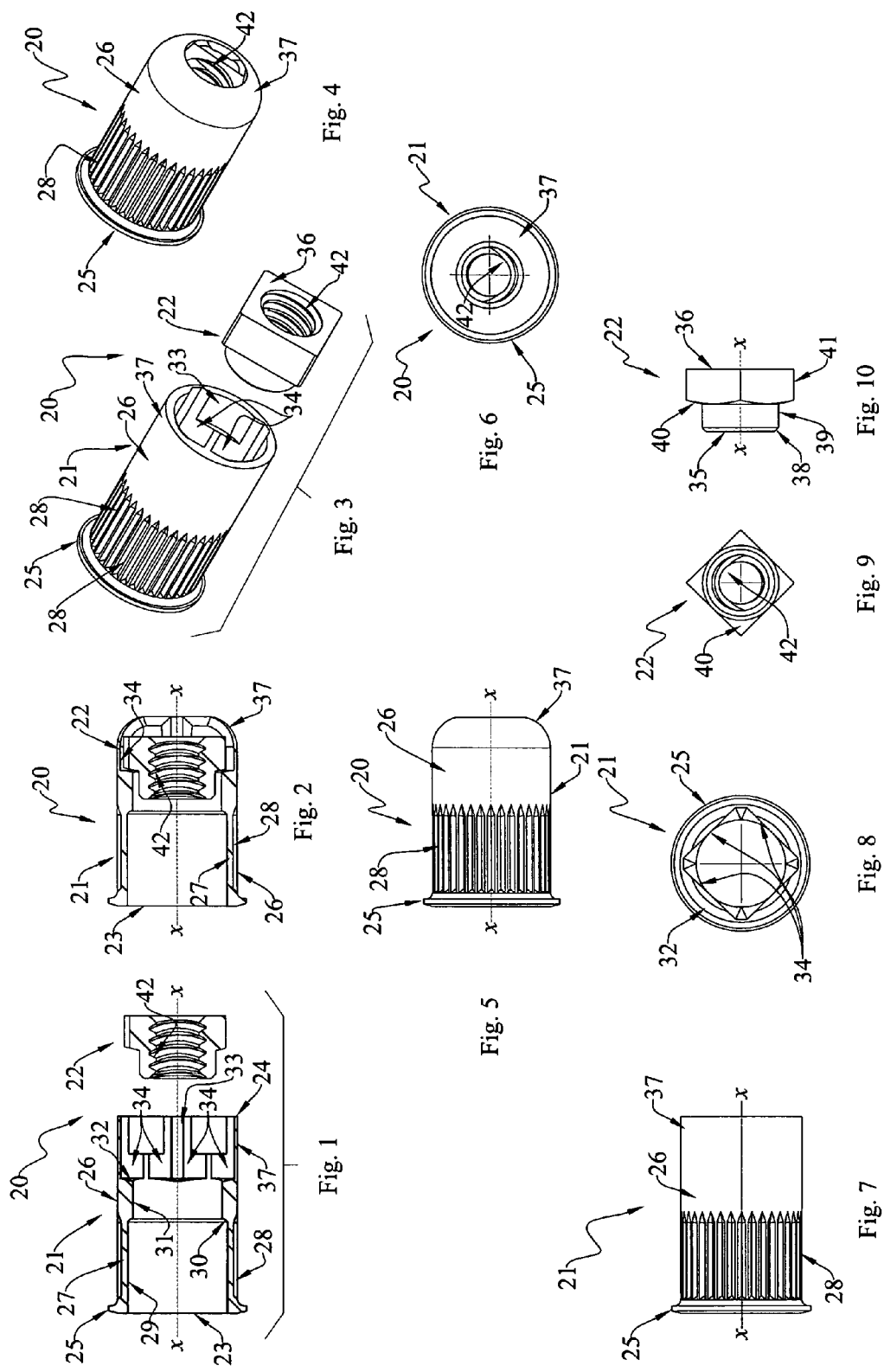

FASTENER ASSEMBLY HAVING MARGINAL END PORTION OF BODY DEFORMED ABOUT CAPTURED NUT

TECHNICAL FIELD

The present invention relates generally to the field of fasteners, and, more particularly, to an improved fastener assembly in which a member, such as a nut, is captured and held within the in-turned deformed marginal end portion of an elongated tubular body.

BACKGROUND ART

Fasteners exist in a myriad of different forms and shapes.

With a rivet, a tubular portion is generally passed through an opening in a wall. A head on the rivet engages one side of the wall, an intermediate portion passes through the wall opening, and a marginal end tubular portion extends beyond the wall. This marginal end portion is thereafter deformed into tight engagement with the wall.

It is sometimes necessary to provide a threaded portion on such a member. Such a portion may be either internally or externally threaded, as desired.

Accordingly, there is believed to be a need for an improved rivet-like fastener having a threaded portion thereon.

DISCLOSURE OF THE INVENTION

With parenthetical reference to the corresponding parts, portions or surfaces of the disclosed embodiment, merely for purposes of illustration and not by way of limitation, the present invention provides an improved fastener and an improved method of making a fastener.

In one aspect, the invention provides a fastener (20) that is adapted to be mounted in a hole provided in a wall (not shown). The improved fastener comprises: an elongated tubular body (21) having a first end (23) and a second end (24), having an outwardly-extending flange (25) adjacent the first end, having an intermediate portion (27), and having a thin-walled portion extending from the intermediate portion to the second end, the thin-wall portion being partially defined between concentric inwardly- and outwardly-facing cylindrical surfaces (33, 26) such that the thin-walled portion has an annular cross-section in any plane transverse to the axis of elongation (x-x) of the body, the body also having an abutment surface (32) facing toward the second end; and a member (22) adapted to be inserted into the body through the second end, the member having an abutment surface (40) adapted to bear against the body abutment surface, and having an outer polygonal surface (41); and wherein the distal marginal end portion (37) of the thin-walled portion is plastically deformed about the member to hold the member within the body.

The body may have an inwardly-facing cylindrical surface (31) adjacent the body abutment surface (32). The member may have an axially-extending collar, and the collar may be arranged within the body cylindrical surface.

The body marginal end portion (37) is plastically deformed about the member to hold the member within the body. The member may be held firmly within such deformed marginal end portion. Alternatively, the member may be held loosely within such deformed marginal end portion such that the member may move relative to the body.

The body may have an outer surface, and may be provided with a plurality of circumferentially-spaced longitudinally-extending flutes (28) extending into the body from the outer surface (26) in the vicinity of the intermediate portion.

The body may have inner surface, and may be provided with a plurality of circularly-spaced flat surfaces (34) that are adapted to be deformed into rotation-preventing closely-spaced facing engagement with the member polygonal surface to increase the resistance to relative rotation between the member and body.

The member may be a nut having an internally-threaded through-bore (42).

In another aspect, the invention provides a method of making a fastener (20). This method comprises the steps of: providing an elongated tubular body (21) having a first end (23) and a second end (24), having an outwardly-extending flange (25) adjacent the first end, having an intermediate portion (27), and having a distal marginal end portion (37) adjacent the second end, the body also having an abutment surface (32) facing toward the second end; providing a member (22) having an abutment surface (40) adapted to bear against the body abutment surface; inserting the member into the body through the second end such that the member abutment surface will engage the body abutment surface; and plastically deforming the body marginal end portion about the member to hold the member within the body; thereby to make the fastener.

When practicing this method, the body marginal end portion may be plastically deformed about the member by rolling.

The body marginal end portion may be deformed about the member to firmly hold the member within the body. Alternatively, the body marginal end portion may be deformed about the member to loosely hold the member within the body. The member may move radially with respect to the axis of elongation of the body. In the preferred embodiment, the body has an inwardly-facing surface adjacent the body abutment surface; the member has an axially-extending collar provided with an outwardly-facing surface; the collar is arranged within the body such that the outwardly-facing collar surface is arranged to face the inwardly-facing member surface; and the spacing between the outwardly-facing collar surface and the inwardly-facing member surface determines the extent of permissible radial movement of the member relative to the body axis of elongation.

Accordingly, the general object of the invention is to provide an improved fastener assembly.

Another object is to provide an improved fastener assembly in which the marginal end portion of a body is deformed about a captured nut-like member.

Still another object is to provide an improved rivet-like fastener having a captured nut-like member.

These and other objects and advantages will become apparent from the foregoing and ongoing written specification, the drawings and the appended claims.

BRIEF DESCRIPTION OF THE DRAWINGS

FIG. 1 is a fragmentary longitudinal vertical sectional view of the improved fastener prior to assembly, this view showing the nut as being arranged in aligned relation to the tubular body.

FIG. 2 is a view similar to FIG. 1, but showing the nut as having been inserted into the body, and showing the distal marginal end portion of the body as having been suitably deformed so as to capture the nut within the body.

FIG. 3 is an exterior isometric view, showing the nut in aligned relation to the body.

FIG. 4 is an exterior isometric view generally similar to FIG. 3, but showing the nut as having been inserted into the body, and showing the marginal end portion of the body as having been deformed so as to capture the nut therewithin.

FIG. 5 is a side elevational view of the assembled fastener shown in FIG. 2.

FIG. 6 is a right end elevation of the assembled fastener shown in FIG. 5.

FIG. 7 is a side elevation of the body shown in FIG. 1, prior to deformation of the marginal end portion.

FIG. 8 is a right end elevation of the tubular body shown in FIG. 7.

FIG. 9 is a left end elevation of the nut.

FIG. 10 is a side elevation of the nut.

DESCRIPTION OF THE PREFERRED EMBODIMENTS

At the outset, it should be clearly understood that like reference numerals are intended to identify the same structural elements, portions or surfaces consistently throughout the several drawing figures, as such elements, portions or surfaces may be further described or explained by the entire written specification, of which this detailed description is an integral part. Unless otherwise indicated, the drawings are intended to be read (e.g., crosshatching, arrangement of parts, proportion, degree, etc.) together with the specification, and are to be considered a portion of the entire written description of this invention. As used in the following description, the terms "horizontal", "vertical", "left", "right", "up" and "down", as well as adjectival and adverbial derivatives thereof (e.g., "horizontally", "rightwardly", "upwardly", etc.), simply refer to the orientation of the illustrated structure as the particular drawing figure faces the reader. Similarly, the terms "inwardly" and "outwardly" generally refer to the orientation of a surface relative to its axis of elongation, or axis of rotation, as appropriate.

Referring now to the drawings, and, more particularly to FIGS. 1-5 thereof, the present invention broadly provides an improved fastener assembly, of which the presently-preferred form is generally indicated at 20. Fastener assembly 20 is shown as including a horizontally-elongated tubular body, generally indicated at 21, and a member 22 that is adapted to be inserted axially into the body and to be captured and held therewithin. In the preferred embodiment, member 22 is a nut-like element, as described infra. Fastener 20 is shown as having a horizontal axis x-x.

Adverting now to FIG. 1, body 21 is depicted as being a horizontally-elongated tubular member having an annular vertical left end face 23 and an annular vertical right end face (24). The body has an outer surface that sequentially includes (from left-to-right in FIG. 1): an outwardly extending flange 25 adjacent left end face 23, and an outwardly-facing horizontal cylindrical surface 26 extending rightwardly from flange 25 to join right end face 24. A plurality of circularly-spaced longitudinally-extending flutes or grooves, severally indicated at 28, extend into the body from an intermediate portion 27 of its outer surface 26 adjacent flange 25. These flutes or grooves tend to prevent body from rotating relative to a hole in a wall (not shown), through which hole the fastener is inserted.

Body 21 is also shown as having a stepped axial through-bore that sequentially includes (again from left-to-right in FIG. 1): an inwardly-facing horizontal cylindrical surface 29 extending rightwardly from left end face 23, leftwardly- and inwardly-facing frusto-conical surface 30, an inwardly-facing horizontal cylindrical surface 31, a rightwardly-facing annular vertical abutment surface 32, and a horizontal cylindrical surface 33 continuing rightwardly therefrom to join right end face 24. The marginal end portion 37 of the body inner surface is provided with a plurality of circumferentially-spaced flats, severally indicated at 34, that extend leftwardly into the body from its right end face 24. Two of these flats may be seen in FIG. 3. Thus, as best shown in FIG. 7, the outer surface of the pre-deformed body somewhat resembles a shot gun shell.

As best shown in FIGS. 1, 9 and 10, nut 22 is a specially-configured horizontally-elongated tubular member having a longitudinal axis x-x, an annular vertical left end face 35, an annular vertical right end face 36, and an outer surface that sequentially includes (from left-to-right): a leftwardly- and outwardly-facing frusto-conical surface 38 extending rightwardly from left end face 35, a horizontal cylindrical surface 39, a leftwardly-facing annular convex surface 40, and a polygonal or head portion 41 continuing rightwardly therefrom to join the outer margin of right end face 36. The nut is provided with an internally-threaded central axial through-bore 42. Thus, the nut has a collar portion, bounded by cylindrical surface 39, that is adapted to be inserted into the body so as be arranged in spaced facing relation to body cylindrical surface 31. In this position (see FIG. 2), nut abutment surface 40 is arranged to face toward and engage body abutment surface 32.

Thereafter, the rightward distal marginal end portion of the body is bent or otherwise deformed inwardly, as by rolling or the like, through an arc distance of about 90 degrees to capture and hold the nut within the body, as shown in FIG. 2. If desired, the nut may be firmly held within the body such that the body and nut together form a monolithic relatively-rigid subassembly. Alternatively, the nut may be loosely held within the body such that the nut may float, or move radially, relative to the body, to the extent determined by the radial clearance therebetween. The eight flat surfaces 34 on the body are arranged to at least face, and sometimes engage, the four outwardly-facing planar faces of polygonal surface 41 on the nut to prevent relative rotation between the nut and body.

Therefore, the invention broadly provides an improved fastener assembly 20 that is adapted to be mounted in a hole provided in a wall (not shown). The improved fastener assembly broadly includes an elongated tubular body (21) having a first end (23) and a second end (24), having an outwardly-extending flange (25) adjacent the first end, having an intermediate portion (27), and having a distal marginal end portion (37) adjacent the second end. The body also has an abutment surface (32) facing toward the second end. The improved fastener assembly also includes a member (22), such as (but not limited to) a nut-like member that is adapted to be selectively inserted into the body through the second end thereof. The member has an abutment surface (40) adapted to bear against the body abutment surface (32). The member also has an outer polygonal surface (41). The body marginal end portion is adapted to be plastically deformed about the member to hold the member within the body.

In another aspect, the invention broadly provides an improved method of making a fastener assembly (20), which broadly includes the steps of: providing an elongated tubular body (21) having a first end (23) and a second end (24), having an outwardly-extending flange (25) adjacent the first end, having an intermediate portion (27), and having a marginal end portion (37) adjacent the second end. The body also has an abutment surface facing toward the second end. The improved method also includes the steps of providing a member (22) having an abutment surface (40) adapted to bear against the body abutment surface; inserting the member into the body through the second end such that the member abutment surface will engage the body abutment surface; and plastically deforming the body marginal end portion (37) about the member to hold the member within the body; thereby to make the fastener. As noted above, the nut may be tightly or loosely held within the body, depending on whether one desires the nut to move, or not move, relative to the body.

Modifications

The present invention contemplates that many changes and modifications may be made. For example, the materials of construction are not deemed to be critical, and may be changed or varied. The longitudinally-extending flutes or grooves may be employed, omitted, or modified, as desired. For example, the tubular body may have other polygonal shapes and configurations to increase contact with the wall and to increase the frictional resistance of the body to rotate or turn within the hole into, or through, which it has been inserted. Members other than nuts and nut-like members may also be captured and held within the tubular body.

The materials of construction are not deemed to be critical, and may be readily changed or modified, as desired.

Therefore, while the presently-preferred form of the improved fastener has been shown and described, and several modifications thereof discussed, persons skilled in this art will readily appreciate that various additional changes and modifications may be made, without departing from the spirit of the invention, as defined and differentiated by the following claims.

What is claimed is:

1. A fastener adapted to be mounted in a hole provided in a wall, comprising:

an elongated tubular body having a first end and a second end, having an outwardly-extending flange adjacent said first end, having an intermediate portion, and having a thin-walled portion extending from said intermediate portion to said second end, said thin-walled portion being partially defined between concentric inwardly- and outwardly-facing cylindrical surfaces such that said thin-walled portion has an annular cross-section in any plane transverse to the axis of elongation of said body, said body also having an abutment surface facing toward said second end; and a member inserted into said body through said second end, said member having an abutment surface adapted to bear against said body abutment surface, and having an outer polygonal surface; and wherein the distal marginal end portion of said thin-walled portion adjacent said second end is plastically deformed inwardly about said member to hold said member within said body.

2. A fastener as set forth in claim 1 wherein said inwardly-facing cylindrical surface extends between said body abutment surface and said body second end.

3. A fastener as set forth in claim 2 wherein said member has an axially-extending collar.

4. A fastener as set forth in claim 3 wherein said collar is arranged within an inwardly-facing cylindrical surface on said body.

5. A fastener as set forth in claim 1 wherein said member is held firmly within such deformed marginal end portion.

6. A fastener as set forth in claim 1 wherein said member is held loosely within such deformed marginal end portion such that said member may move relative to said body.

7. A fastener as set forth in claim 1 wherein said body has an outer surface, and wherein said body is provided with a plurality of circumferentially-spaced longitudinally-extending flutes extending into said body from said outer surface in the vicinity of said intermediate portion.

8. A fastener as set forth in claim 1 wherein said body has an inner surface, and wherein said body inner surface is provided with a plurality of circularly-spaced flat surfaces that are adapted to be deformed into facing engagement with said member polygonal surface to increase the resistance to relative rotation between said member and body.

9. A fastener as set forth in claim 1 wherein said member is a nut having an internally-threaded through-bore.

* * * * *